Figure 1:
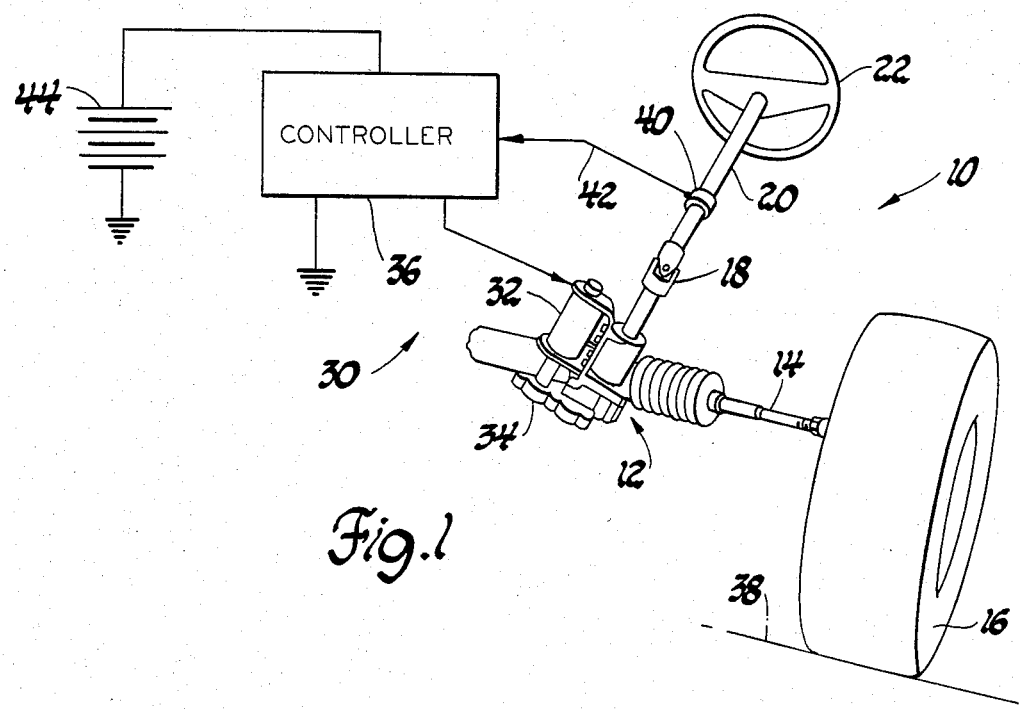

United States Patent [19]

Kade

[11] Patent Number: 4,532,567
[45] Date of Patent: Jul. 30, 1985

[54] ELECTRIC POWER STEERING STALL PROTECTION CIRCUIT

[75] Inventor: Alexander Kade, Detroit, Mich.

[73] Assignee: General Motors Corporation, Detroit, Mich.

[21] Appl. No.: 467,492

[22] Filed: Feb. 18, 1983

[51] Int. Cl.³ .............................................. H02H 7/00
[52] U.S. Cl. ....................................... 361/31; 361/93; 180/79.1; 318/434
[58] Field of Search ....................... 361/31, 57, 58, 93; 180/79.1; 318/434

[56] References Cited

U.S. PATENT DOCUMENTS

| | | | |
|---|---|---|---|
| 3,388,307 | 6/1968 | Prapis et al. | 318/434 |
| 3,399,335 | 8/1968 | Prapis et al. | 318/434 |
| 3,543,124 | 11/1970 | Espen et al. | 361/31 X |
| 3,582,746 | 6/1971 | Nye, Jr. et al. | 318/434 X |
| 3,649,897 | 3/1972 | Messick | 318/434 |
| 3,868,554 | 2/1975 | Konrad | 318/434 |
| 3,931,557 | 1/1976 | Osburn | 318/434 |
| 3,955,130 | 5/1976 | Graf | 318/434 X |
| 4,217,527 | 8/1980 | Bourke et al. | 318/434 X |
| 4,223,254 | 9/1980 | Adams | 180/79.1 X |

Primary Examiner—Reinhard J. Eisenzopf
Attorney, Agent, or Firm—Mark A. Navarre

[57] ABSTRACT

An overcurrent circuit interrupts energization of the electric motor of a motor vehicle electric power steering system whenever the motor current exceeds an overcurrent limit, thereby defining an overcurrent duty cycle. When the overcurrent duty cycle reaches a value indicative of motor stalling, the overcurrent limit is reduced to protect the motor and its drive circuitry during prolonged motor stalling.

3 Claims, 2 Drawing Figures

ELECTRIC POWER STEERING STALL PROTECTION CIRCUIT

This invention relates to an electric motor assisted power steering system for a vehicle, and more particularly to circuitry for protecting the electric motor and its drive circuitry from damage due to overcurrent when the motor is stalled.

A power steering system of the type envisioned by this invention includes a transducer for sensing the steering force or torque supplied by the operator of the vehicle, an electric motor connected to the steering linkage, and a control circuit responsive to the operator supplied force for energizing the motor to provide a steering assist force which aids the operator in overcoming the road load force generated by the frictional engagement of the vehicle tires and the road surface to thereby steer the vehicle. To protect the motor and its drive circuitry, such system should also include an overcurrent detection circuit for interrupting motor energization whenever the motor current rises above a predetermined reference current level. The reference level is typically chosen relative to the current or power capacity of the motor and its drive circuitry such that an adequate level of assist can be provided under the highest normally occurring level of road load force—as might be encountered during parking maneuvers. Since such maneuvers are relatively short in duration the reference current level may be set fairly high without endangering the motor or its drive circuitry. However, in certain operating conditions, as when the vehicle tires are steered against an immovable object such as a street curb, a prolonged condition of motor stalling may occur. Under such conditions the back-EMF of the motor collapses, resulting in excessive motor current. If the motor current is limited at the reference current level referred to above, prolonged motor stalling could cause overheating of the motor and its drive circuitry, possibly damaging or destroying the same.

Accordingly, it is an object of this invention to provide an improved electric motor assisted power steering system wherein an overcurrent circuit interrupts motor energization when the motor current exceeds a reference current level and wherein the reference current level is decreased to protect the motor and its drive circuitry when a motor stall condition is detected.

It is a further object of this invention to provide an improved system of the above type wherein the motor stall condition is detected by monitoring the operation of the overcurrent circuit.

It is a further, more specific object of this invention to provide an improved electric motor assisted power steering system wherein an overcurrent circuit interrupts motor energization whenever the motor current exceeds a reference current level to thereby define an overcurrent duty cycle, and wherein the reference current level is reduced to protect the motor and its drive circuitry when the overcurrent duty cycle reaches a value indicative of motor stall.

These objects are carried forward by establishing a variable reference overcurrent signal, comparing such signal to a signal representative of the actual motor current, interrupting motor energization whenever the motor current signal exceeds the reference overcurrent signal, and by reducing the value of the reference overcurrent signal when the overcurrent duty cycle reaches a level indicative of motor stalling. When a motor stall condition is indicated, the reference overcurrent signal is reduced to a motor current value that is sufficiently low to protect the motor and its drive circuitry from damage under prolonged motor stall conditions. The reduced reference overcurrent signal level is sufficiently high, on the other hand, to permit the motor to be accelerated to an appropriate speed when the stall condition is removed. At such point the motor back-EMF increases and the reference overcurrent signal is increased to its normal value.

It will be understood that the terms "force" and "torque" as used in reference to steering parameters are directly proportional to each other and, broadly speaking, may be interchanged. A force acts along a linear axis while a torque is a force that acts along an axis of rotation.

IN THE DRAWINGS

FIG. 1 generally depicts an electric motor assisted power steering system and a motor controller therefor.

Figure 2:
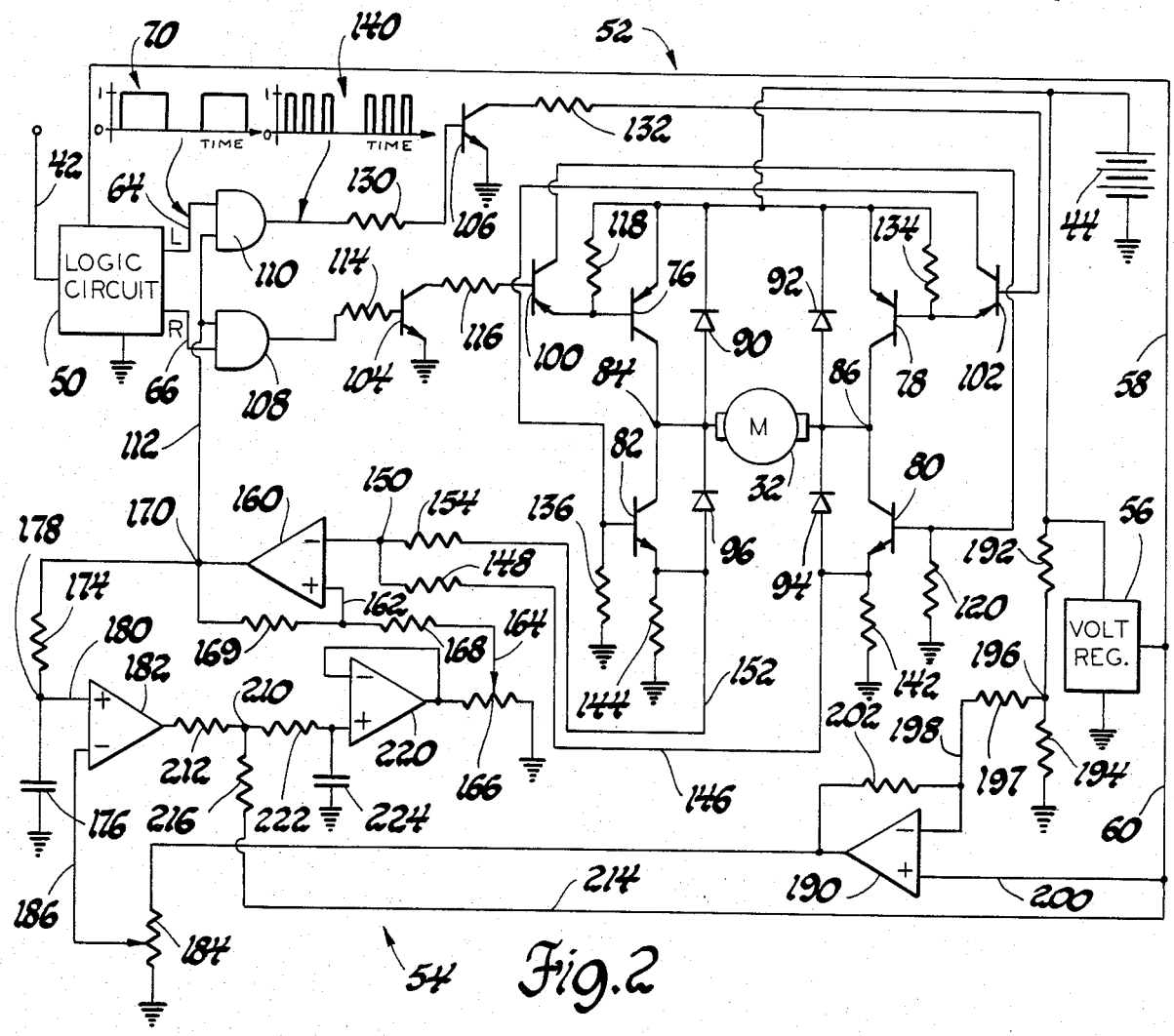

FIG. 2 is a circuit diagram of the motor controller depicted in FIG. 1, illustrating the motor stall protection circuitry of this invention.

Referring now more particularly to FIG. 1, reference numeral 10 generally designates a motor vehicle power steering system of a type that may be used in conjunction with the control system of this invention. In the illustrated embodiment, the steering mechanism 12 is of the rack and pinion type which essentially consists of a toothed rack (not shown) and a pinion gear (also not shown) in engagement therewith. Each end of the rack is connected to a steering tie rod 14, which in turn, is connected to the steering knuckles (not shown) of a respective dirigible vehicle wheel 16 such that lateral movement of the rack and tie rods 14 operates to steer the vehicle wheels 16 in unison. The pinion gear is connected through universal joint 18 and steering column 20 to an operator-manipulated steering wheel 22 and so that the vehicle operator may rotate the pinion gear and hence steer the vehicle wheel 16 by rotating the steering wheel 22.

An electric power assist mechanism designated generally by reference numeral 30 includes an electric motor 32 connected through a gear box 34 to the pinion gear of the steering mechanism 12, and a controller 36 for energizing motor 32 during steering maneuvers in order to assist the operator of the vehicle in overcoming road load forces generated by frictional engagement of the vehicle wheels 16 and the road surface 38. A torque transducer 40 senses the torque applied by the operator of the vehicle to the steering wheel 22 and applies a signal in accordance therewith to controller 36 via line 42. Controller 36 responds to the sensed torque by suitably connecting the vehicle battery 44 to motor 32 for achieving the desired level of steering assist.

Torque transducer 40 may be any conventional torque transducer, such as a strain-gauge or a variable reluctance mechanism responsive to the twisting of a torsion bar (not shown) in the steering column 18.

FIG. 2 illustrates the controller 36 of FIG. 1 in more detail. Also shown in FIG. 2 are electric motor 32 and vehicle battery 44. The controller 36 may be functionally divided into three parts: a logic circuit designated by reference numeral 50, a motor driver circuit designated generally by reference numeral 52, and the motor stall protection circuit of this invention designated generally by reference numeral 54. Power for the motor driver circuit 52 is supplied directly from the vehicle battery 44 (which may be a conventional 12-volt battery) while power for the logic circuit 50 and stall protection circuit 54 is supplied by voltage regulator 56 which is connected across battery 44. Voltage regulator 56 may be a standard component such as a series-pass regulator mechanism and operates in the illustrated embodiment to produce a lower regulated voltage (such as 5 volts) which is supplied to logic circuit 50 via line 58 and to the stall protection circuit 54 via line 60.

The logic circuit 50 is responsive to the torque signal on line 42 for developing a pulse-width-modulated control signal on either left output line 64 or right output line 66 to control energization of motor 32. The direction of the torque signal on line 42 indicates whether the operator is attempting to steer the vehicle left or right, and the magnitude of the signal indicates the amount of torque applied. If the operator applies counterclockwise torque on steering wheel 22 to effect a left turn of the vehicle, logic circuit 50 develops a pulse-width-modulated signal such as designated by reference numeral 70 on left output line 64. If the operator applies clockwise torque on steering wheel 22 to effect a right turn of the vehicle, logic circuit 50 develops a similar pulse-width-modulated signal on right output line 66. In either case, the width of the pulses developed on lines 64 or 66 are varied in direct relation to the magnitude of torque sensed by torque transducer 40.

In the illustrated embodiment, the electric motor 32 is depicted as a DC motor and the motor drive circuitry 52 is in the form of what is commonly referred to in the electronic art as an H-switch. Essentially the H-switch comprises four power transistors 76, 78, 80 and 82 connecting the motor 32 at its terminals 84 and 86 across vehicle battery 44 such that diagonally opposed transistors may be selectively and concurrently energized to control the direction of motor current and hence the direction of motor rotation. For example, a motor current from terminal 84 to terminal 86 may be effected by biasing power transistors 76 and 80 to their conductive states, and a motor current from terminal 86 to terminal 84 may be effected by biasing power transistors 78 and 82 to their conductive states. One direction of energization produces a steering force for assisting right-hand turning maneuvers while the other direction of energization produces a steering force for assisting left-hand turning maneuvers. As will become apparent, the left output line 64 and right output line 66 of logic circuit 50 are connected to the H-switch for controlling the energization of motor 32 such that the steering assist force provided by motor 32 aids the force supplied by the operator of the vehicle to steer the vehicle wheels 16. A diode 90, 92, 94, 96 is connected across the emitter-collector circuit of each of the H-switch power transistors 76, 78, 80 and 82 to protect the respective transistor at turn-off by circulating the inductive energy stored in motor 32. Such diodes are commonly called free-wheeling or flyback diodes.

Driver transistors 100 and 102 are connected to diagonally opposed H-switch power transistors such that driver transistor 100 controls the conduction of power transistors 76 and 80 while driver transistor 102 controls the conduction of power transistors 78 and 82. In turn, driver transistors 104 and 106 control the conduction of driver transistors 100 and 102, respectively. The conduction of transistors 104 and 106 are controlled by AND gates 108 and 110. Left output line 64 of logic circuit 50 is connected as an input to AND gate 110 and right output line 66 of logic circuit 50 is connected as an input to AND gate 108. The other inputs to AND gates 108 and 110 are connected to line 112, the logic level of which is controlled by the stall protection circuit 54 of this invention.

A brief description of the relation between logic circuit 50 and driver circuit 52 will now be described. It will be assumed for the purpose of facilitating such description that line 112 from the stall protection circuit 54 is maintained at a logic one voltage potential. When the operator of the vehicle exerts clockwise torque on steering wheel 22, the magnitude and direction of such torque is detected by torque transducer 40 and applied to logic circuit 50 via line 42. Since clockwise rotation of steering wheel 22 produces a right-hand vehicle steering maneuver, logic circuit 50 develops a pulse-width-modulated signal on right output line 66, the width of each such pulse being related to the magnitude of torque or steering force supplied by the operator. Since line 112 is maintained at a logic one voltage potential the pulse-width-modulated signal on right output line 66 passes unchanged through AND gate 108 and is applied through resistor 114 to the base input of driver transistor 104, thereby controlling its conduction. When the pulse-width-modulated signal is at a logic one voltage potential, transistor 104 is biased to a conductive state. In such case, the base input of driver transistor 100 is lowered to nearly ground potential through resistor 116 and the collector-emitter circuit of transistor 104. Since resistor 118 maintains the emitter of transistor 100 at a relatively high voltage level, driver transistor 100 is also biased to a conductive state. Transistor 100 thereby completes a conduction path through battery 44 and the base-emitter circuits of power transistors 76 and 80 which biases such transistors to a conductive state to energize motor 32 such that the motor current enters terminal 84 and exits terminal 86. The motor 32 and gear box 34 are configured so that such energization produces a steering assist force which aids the operator of the vehicle in effecting the right-hand steering maneuver. Resistors 118 and 120 are connected to the base terminals of power transistors 76 and 80 and act to bias such transistors to their nonconductive states when driver transistor 100 is nonconductive.

When the pulse-width-modulated signal at the output of AND gate 108 is at a logic zero voltage potential, driver transistors 104 and 100 are biased to their nonconductive states, which in turn biases power transistors 76 and 80 to their nonconductive states, deenergizing motor 32. When motor 32 is so deenergized, free-wheeling diodes 96 and 92 conduct to circulate the inductive energy stored in motor 32 through battery 44.

In the manner described above, a righthand steering assist force is provided by motor 32 so long as the torque transducer 40 senses that the operator is applying clockwise torque to steering wheel 22. When the operator ceases to apply steering torque a negligible amount of torque (due only to the inertia of the steering column) is sensed at transducer 40, and logic circuit 50 ceases to develop pulse-width-modulated signals on right output line 66.

When the operator exerts counterclockwise torque on steering wheel 22, torque transducer 40 senses such torque and applies a signal in accordance therewith to logic circuit 50 via line 42, as noted above. Accordingly, logic circuit 50 produces a pulse-width-modulated signal on left output line 64 such as the signal designated by reference numeral 70. Since line 112 is maintained at a logic one voltage potential (for the purpose of this discussion) the pulse-width-modulated signal passes unmodified through AND gate 110 and is applied through resistor 130 to the base of driver transistor 106. When the pulse-width-modulated signal is at a logic one voltage potential, driver transistor 106 is biased to a conductive state. In such case, the base input of driver transistor 102 is lowered to nearly ground potential through resistor 132 and the collector-emitter circuit of driver transistor 106. Since resistor 134 maintains the emitter of transistor 102 at a relatively high voltage level, driver transistor 102 is also biased to a conductive state. Transistor 102 thereby completes a conduction path through battery 44 and the base-emitter circuits of power transistors 78 and 82 which biases such transistors to a conductive state to energize motor 32 such that the motor current enters terminal 86 and exits terminal 84. Such energization produces a steering assist force which aids the operator of the vehicle in effecting the left-hand steering maneuver. Resistors 134 and 136 are connected to the base terminals of power transistors 78 and 82 and act to bias such transistors to their nonconductive states when transistor 102 is nonconductive.

When the pulse-width-modulated signal at the output of AND gate 110 is at a logic zero voltage potential, driver transistors 106 and 102 are biased to their nonconductive states, which in turn, bias power transistors 78 and 82 to their nonconductive states, deenergizing motor 32. When motor 32 is so deenergized, free-wheeling diodes 90 and 94 conduct to circulate the inductive energy stored in motor 32 through battery 44.

In the manner described above, a left-hand steering assist force is provided by motor 32 so long as the torque transducer 40 senses that the operator is applying counterclockwise torque to steering wheel 22. When the operator ceases to apply steering torque, logic circuit 50 ceases to develop pulse-width-modulated signals on left output line 64.

As indicated, the present invention provides a current limiting system for an electric motor assisted power steering system of the type generally described above, which current limiting system reduces the current limit value to a relatively low level when the current limiting duty cycle indicates that the motor is stalled. Accordingly, it will be understood that this invention is not limited to the logic circuit 50 and driver circuit 52 described above.

In the illustrated embodiment, the current limiting circuit 54 of this invention interfaces with driver circuit 52 via line 112, which is applied as an input to both AND gates 108 and 110. Previously it was assumed that line 112 was at a logic one voltage potential so that pulse-width-modulated signals on left or right output lines 64 and 66 of logic circuit 50 passed through AND gates 110 or 108 unmodified. When line 112 is lowered to a logic zero voltage potential, however, the outputs of both AND gates 108 and 110 are also maintained at a logic zero voltage potential. As will be described below, the current limiting circuit of this invention lowers line 112 to a logic zero voltage potential whenever the motor current exceeds a reference current level to thereby lower the output voltages of AND gates 108 and 110 to a logic zero voltage potential to protect motor 32 by interrupting motor energization. When the motor current drops below the reference level, line 112 is returned to a logic one voltage potential and thereby enables the pulse-width-modulated signals to pass unmodified through AND gates 108 or 110. During current limit operation, the signal at the output of AND gate 108 or AND gate 110 would be similar to the signal designated generally by reference numeral 140.

The stall protection circuit 54 of this invention will now be more particularly described. Motor current shunts 142 and 144 are connected to the motor H-switch such that the motor current must pass through either shunt 142 or 144. When power transistors 76 and 80 are conducting, the motor current passes through shunt 142; when power transistors 78 and 82 are conducting, the motor current passes through shunt 144. Accordingly, the sum of the shunt voltages is directly proportional to the motor current. Line 146 applies the voltage across shunt 142 through resistor 148 to a summing junction 150, and line 152 applies the voltage across shunt 144 through resistor 154 to summing junction 150. The voltage at summing junction 150 is thus directly proportional to the motor current, and summing junction 150 is connected to the minus input of operational amplifier 160 for comparing the motor current to a reference current signal. The reference current signal is applied to the plus input of operational amplifier 160 via line 162 and its magnitude is determined by the voltage on line 164. Such voltage has a nominal value representative of a relatively high motor current such as 70 amperes and is determined by the setting of potentiometer 166. As will later be explained, the nominal value of 70 amperes is reduced to a lower value such as 25 amperes when a motor stall condition is detected. It will be recognized that the nominal current reference value (70 amperes) is chosen relative to the motor capacity and the desired level of steering assist force. Preferably, the reference current value is determined such that an adequate level of assist will be provided under the highest normally occurring level of road load force—as might be encountered during parking maneuvers. Resistors 168 and 169 serve to establish upper and lower trip levels around the reference current level (hysteresis) to prevent rapid switching of operational amplifier 160 due to the presence of electrical noise at either input thereof. The output of operational amplifier 160 is connected to terminal 170, which in turn, is connected via line 112 to AND gates 108 and 110. When the motor current exceeds the upper trip level the output of operational amplifier 160 assumes a logic zero voltage potential to interrupt the pulse-width-modulated signal, deenergizing motor 32. In this way, the motor 32 and its drive circuit 52 are protected from damage due to motor current levels that exceed the reference current level. When the motor current falls below the lower trip level, the output of operational amplifier 160 assumes a logic one voltage potential, enabling a pulse-width-modulated signal on left or right output lines 64 or 66 to pass unmodified through AND gates 110 or 108.

This invention recognizes that the action of operational amplifier 160 described above defines an ON-OFF overcurrent duty cycle at terminal 170 which is related to the operating condition of motor 32. In most steering maneuvers, the motor current (neglecting transients) will be less than the nominal reference current value (70 amperes) and terminal 170 will be maintained at a logic one voltage potential. Such operation defines a very high duty cycle at terminal 170. During parking or other like maneuvers requiring a large amount of steering assist force, the motor current may exceed the upper trip level of operational amplifier 160. Operational amplifier 160 responds under such conditions by lowering line 112 to a logic zero voltage potential to interrupt motor energization. When the motor current falls below the lower trip level, the output of operational amplifier 160 is returned to a logic one voltage potential, restoring motor energization. Such operation produces a somewhat lower duty cycle at terminal 170 than occurs during most operating conditions. However, if the reference current value is chosen as described above to provide adequate assist under the highest normally occurring levels of road load force, the duty cycle of operational amplifier 160 is not significantly different during parking maneuvers than in other operation. For example, the duty cycle at terminal 170 would be nearly 100% under most steering maneuvers and about 90% or higher during parking maneuvers.

When the motor is stalled or nearly stalled, as for example when the vehicle tires are steered against an immovable object or when the mechanical limit of movement of the steering mechanism 12 has been reached, the back-EMF of motor 32 is significantly reduced, resulting in an unusually high amount of motor current. Under such conditions, operational amplifier 160 repeatedly interrupts motor energization, and the duty cycle at terminal 170 becomes significantly lower than in normal operation. This invention recognizes that under such conditions, the duty-cycle of operational amplifier 160 (at terminal 170) becomes directly proportional to the motor back-EMF, and hence the motor speed. Accordingly, the stall protection circuit 54 of this invention senses the duty cycle of operational amplifier 160 at terminal 170 and reduces the current reference value when the duty cycle of operational amplifier 160 is lower than a reference duty cycle indicative of motor stalling. As a result, motor 32 and its drive circuitry 52 are protected from damage under prolonged conditions of motor stalling.

This invention also recognizes that the overcurrent duty cycle indicative of motor stalling varies as a function of the terminal voltage of battery 44. Under motor stall conditions, operational amplifier 160, acting alone, would limit the motor current to 70 amperes, and its duty cycle would be nearly equal to the motor current duty cycle. Normally, the battery voltage under such conditions would be about 13 volts, requiring a current duty cycle of a certain value to supply 70 amperes to the motor. However, other unrelated conditions (such as engine stalling or generator failure) may result in a lower battery voltage, such as 11 volts. In such case, the duty cycle required to supply 70 amperes to the motor is greater than when the battery is at its normal 13 volts. Thus, the duty cycle indicative of motor stall is different when the battery is at 13 volts than when at 11 volts. Accordingly the stall protection circuitry of this invention includes means for establishing a reference duty cycle which is compensated for fluctuations in the terminal voltage of battery 44. When the battery voltage increases, the reference duty cycle indicative of stall decreases; when the battery voltage decreases, the reference duty cycle increases.

The duty cycle of operational amplifier 160 is sensed by the series RC circuit comprising resistor 174 and capacitor 176, such circuit being connected between terminal 170 and ground potential. A DC voltage level is developed at the terminal 178 between capacitor 176 and resistor 174 which is directly proportional to the duty cycle of operational amplifier 160. Terminal 178 is applied via line 180 to the plus input of operational amplifier 182 for comparing the sensed duty cycle to a reference duty cycle which is indicative of motor stalling. The reference duty cycle is established by potentiometer 184 and the reference duty cycle signal is applied to the minus input of operational amplifier 182 via line 186. The current through potentiometer 184 and hence the value of the reference duty cycle is determined by operational amplifier 190. A voltage divider connected across battery 44 and comprising resistors 192 and 194 establishes a voltage at terminal 196 which is applied through resistor 197 via line 198 to the minus input of operational amplifier 190. The output of voltage regulator 56 is applied via lines 60 and 200 to the plus input of operational amplifier 190 as an offset voltage, and resistor 202 is connected from the amplifier output to its minus input. The nominal output voltage of operational amplifier 190 is thus equal to that of the offset voltage, and its actual value varies about the offset voltage as a function of the terminal voltage of battery 44. The tap of potentiometer 184 is set relative to the nominal output level of operational amplifier 190 such that the duty-cycle reference on line 186 is indicative of motor stalling when the battery voltage is at its nominal value. When the battery voltage increases, the reference duty cycle value on line 186 decreases, when the battery voltage decreases, the reference duty cycle on line 186 increases. As mentioned above, such operation compensates the reference duty cycle for fluctuations in the voltage of battery 44.

The output of operational amplifier 182 is connected through resistor 212 to terminal 210. In addition, the output of voltage regulator 56 is applied via lines 60 and 214 and through pull-up resistor 216 to terminal 210. Terminal 210 is applied to the plus input of operational amplifier 220 through an RC filter comprising resistor 222 and capacitor 224. The output of operational amplifier 220 determines the current through potentiometer 166 and hence the value of the overcurrent reference signal on line 162.

When the duty cycle of operational amplifier 160 is higher than the motor stall reference duty cycle (as would be the case under normal operating conditions) the output of operational amplifier 182 is at a logic one voltage potential and the voltage potential at terminal 210 is accordingly maintained at a relatively high level. In such case the output of operational amplifier 220 is also maintained at a relatively high voltage potential. The position of the tap on potentiometer 166 is chosen such that under these conditions, the overcurrent reference signal on line 162 corresponds to approximately 70 amperes. When the duty cycle of operational amplifier 160 drops below the reference duty cycle signal on line 186, a motor stall condition is indicated and the output of operational amplifier 182 falls to a logic zero voltage potential. In turn, the voltage at terminal 210 falls to a relatively low voltage potential and capacitor 224 is discharged through resistors 222 and 212. As capacitor 224 discharges, the output of operational amplifier 220 gradually falls to a relatively low voltage potential, and the overcurrent reference signal on line 164 is correspondingly reduced to its lower value, limiting further motor current to approximately 25 amperes. Although the reduced overcurrent reference of 25 amperes is somewhat arbitrary, its value is chosen to protect motor 32 and drive circuitry 52 under prolonged stall conditions such as may occur when the vehicle wheel is steered against an immovable object. On the other hand, the reduced overcurrent reference (25 amperes) is chosen sufficiently high to permit motor 32 to accelerate to an appropriate speed when the stall condition is alleviated. At such time, the motor back-EMF increases thereby reducing the motor current and increasing the duty cycle of operational amplifier 160. When the duty cycle of operational amplifier 160 rises above the duty cycle reference on line 186, the output voltage of operational amplifier 182 rises and capacitor 224 is charged through resistors 216 and 222 to thereby restore the overcurrent reference on line 164 to its normal value of 70 amperes.

It will be appreciated that the various reference values and voltages noted herein are given by way of example only, and that such values are determined by the constraints of the specified system. In this regard it will be recognized that the circuitry disclosed herein represents the preferred embodiment of this invention and that other means for implementing the control functions described herein may fall within the scope of this invention which is defined by the appended claims.

The embodiments of the invention in which an exclusive property or privilege is claimed are defined as follows:

1. A motor vehicle power steering system including a motor providing a steering assist force when energized with current, a source of current, and a switch mechanism responsive to a steering force supplied by the operator of the vehicle for energizing the motor with current from the source to provide a seering assist force which aids the operator in overcoming the steering load, the improvement comprising:

limit means effective when the motor current exceeds an upper reference limit for interrupting motor energization until the motor current falls to a lower reference limit determined in relation to the upper reference limit, the upper reference limit being set at a motor current value sufficiently low to protect the motor and switching mechanism during relatively short duration overcurrent conditions while providing adequate steering assist force under normal levels of steering load;

means for monitoring the duty cycle of motor energization interruption effected by said limit means; and means effective when said monitored duty cycle eaches a value indicative of motor stall for reucing the upper reference limit to a motor current value sufficiently low to protect the motor and switching mechanism during a prolonged period of motor stall caused by excessive levels of steering load.

2. A motor vehicle power steering system including a vehicle battery, an electric motor for providing a steering assist force when connected to said battery, and a switching mechanism responsive to steering force supplied by the operator of the vehicle connecting the motor to the battery to provide a steering assist force which aids the operator of the vehicle in overcoming the steering load, the improvement comprising:

limit means effective when the motor current exceeds an upper reference limit for disconnecting said motor from said battery until the motor current falls to a lower reference limit determined in relation to the upper reference limit, the upper reference limit being set at a motor current value sufficiently low to protect the motor and switching mechanism during relatively short duration overcurrent conditions while providing adequate steering assist force under normal levels of steering load;

means for developing a reference duty cycle of motor disconnection which is indicative of motor stalling for the normal operating voltage of said battery;

means for compensating the reference duty cycle for fluctuations in the voltage of said battery; and means effective when a signal representative of the actual duty cycle of motor disconnection effected by said limit means falls below said reference duty cycle for decreasing the upper reference limit to a motor current value sufficiently low to protect the motor and switching mechanism during a prolonged period of motor stall caused by excessive levels of steering load.

3. A method of operating a motor vehicle power steering system including a battery, a motor for providing a steering assist force when connected to said battery, and a switching mechanism responsive to steering force supplied by the operator of the vehicle for intermittently connecting the motor to the battery to provide a steering assist force which aids the operator in overcoming the steering load, the method comprising the steps of:

disconnecting the motor from the battery to protect the motor and switching mechanism whenever the motor current exceeds an upper reference limit and until the motor current falls to a lower reference limit determined in relation to the upper reference limit, the upper reference limit being set at a motor current value sufficiently low to protect the motor and switching mechanism during relatively short duration overcurrent conditions while providing adequate steering assist force under normal levels of steering load;

developing a reference duty cycle of motor disconnection which is indicative of motor stalling for the normal operating voltage of said battery;

compensating the reference duty cycle for fluctuations in the voltage of said battery such that the reference duty cycle is increased with decreasing battery voltage and decreased with increasing battery voltage;

comparing the actual duty cycle of motor disconnection with the reference duty cycle; and gradually reducing the upper reference limit when the actual duty cycle of motor disconnection falls below the reference duty cycle, the reduced upper reference limit being sufficiently low to protect the motor and switching mechanism during a prolonged period of motor stall caused by excessive levels of steering load.

* * * * *